United States Patent
Snider

Patent Number: 6,128,773
Date of Patent: Oct. 3, 2000

[54] AUTOMATICALLY MEASURING SOFTWARE COMPLEXITY

[75] Inventor: Gregory S. Snider, Mountain View, Calif.

[73] Assignee: Hewlett-Packard Company, Palo Alto, Calif.

[21] Appl. No.: 08/941,829

[22] Filed: Oct. 1, 1997

[51] Int. Cl.$^7$ ..................................................... G06F 9/44
[52] U.S. Cl. .............................. 717/4; 703/22; 702/182; 702/183; 702/186; 714/38
[58] Field of Search ..................... 395/704, 709, 395/500; 714/38, 39, 33, 46, 51; 702/182, 183, 186, 119, 179

[56] References Cited

U.S. PATENT DOCUMENTS

| | | | |
|---|---|---|---|
| 5,297,150 | 3/1994 | Clark | 714/26 |
| 5,345,579 | 9/1994 | Hynes | 395/500.23 |
| 5,655,074 | 8/1997 | Rauscher | 714/38 |

OTHER PUBLICATIONS

Cantone et al, "A New Methodology Proposal For Program Maintenance," Microprocessing and Microprogramming 18, pp. 319–331, 1986.

Melton et al, "A Mathematical perspective for software measures research," Software Engineering Journal, vol. 5 Issue 5, pp. 246–254, Sep. 1990.

O'Neal et al, "Complexity measures for rule–based programs," IEEE Trans. on Knowledge and Data Engineering, vol. 6, Issue 5, pp. 669–680, Oct. 1994.

Byung–Kyoo et al, "Design–level cohesion measures: derivation, comparison, and applications," Proceedings of 20th International Computer Software and Applications Conference, COMPSAC '96, pp. 92–97, Aug. 1996.

Bieman et al, "Measuring Functional Cohesion, " IEEE Transaction on Software Engineering, vol. 20, Issue 8, pp. 644–657, Aug. 1994.

Schneidewind, N. F, "Methodology for validating software mettrics," IEEE Transaction on Software Engineering, vol. 18, Issue 5, pp. 410–422, May 1992.

*Primary Examiner*—Tariq R. Hafiz
*Assistant Examiner*—Tuan Q. Dam

[57] ABSTRACT

The inventive metric tool estimates the entropy of the source code as a measure of the complexity of the software. The tool considers the dependency of the symbols in the software. The tool constructs a data graph representing the structure of the program. Each symbol is shown as a node in the graph, with the dependencies shown as edges connecting the different nodes. The tool uses information theory to estimate the amount of information, or entropy, needed to describe those dependencies. The entropy provides a measure of the complexity of the program, as the greater the entropy, the more complex the dependencies, and the more complex the program.

39 Claims, 2 Drawing Sheets

AUTOMATICALLY MEASURING SOFTWARE COMPLEXITY

TECHNICAL FIELD OF THE INVENTION

This application relates in general to measuring the complexity of software systems, and in specific to a system and method that uses an estimate of the entropy of the internal structure of the software as a measure of the complexity of the software.

BACKGROUND OF THE INVENTION

As software programs become larger and more powerful, their robustness becomes increasingly important in the overall performance of the whole computer system. Consequently, it is essential that the quality of the software be measurable to provide the programmer with an indication of the robustness of the software. One indication of the quality is the structure of the program. A program is generally broken into a set of software modules. A program is deemed to be well-structured if there is good cohesion within a software module and there is loose coupling between the different software modules.

Cohesion describes the interrelationship between functions and variables. Functions and variables are interrelated in the program in the sense that functions can invoke other functions, and functions can access variables. As large programs are segregated into discrete sections known as modules, a problem arises when functions and variables are spread throughout the program and are being called by different functions in different modules. In the situation where a function accesses many variables or where many different functions access any one variable, it is difficult for a programmer reading the program to understand how the consistency of any one variable is maintained. Consequently, good cohesion is desirable, wherein functions in module A invoke other functions or access variables contained with module A, and do not make many references to functions or variables in other modules.

However, this leads to a problem of measuring the degree of conformance of a large software system to the principles of maximal cohesion and minimal coupling. The size of large software systems makes manual evaluation impractical, and subjective evaluations are vulnerable to bias. Typically, software metrics are used to provide an indirect measure of selected "quality" attributes of a software product or process. Software metrics can estimate the presence or value of the desired attribute from real-world inputs that are relatively easy to measure, however, which may be difficult to measure directly in the program. Software metrics can also be used to make predictions of the future value of the desired attribute based on inputs and parameters that are specified in the present. The expectation is that metrics can provide useful feedback to software designers or programmers as to the impact of decisions made during coding, design, architecture, or specification. Without such feedback, many decisions must be ad hoc.

As shown in FIG. 1, a software metric 100 is evaluating program 101. The software metric 100 requires a specification of the actual inputs 104 that are supplied to the program 101, for example, lines of source code and/or historical defect rates. The metric also includes a metric model 102 that maps inputs 104 and parameters 103 to the metric, for example, defect rate=function (lines of source, historical defect rate). The specification of parameters 103 allows for the adjustment of the model 102. The metric model would output 105 a predicted value of the desired attribute, for example the predicted defect rate of a software system. The comparator 106 would allow the comparison of the predicted metric output 105 with the actual output 107, for example, the actual defect rate. This allows for the metric model to be empirically validated. If this cannot be done, the metric is metaphysical in nature. The results 108 of the comparison allows a programmer to change the parameters 103 to fine tune the model 102.

The standard metric that is generally used to compare the results of other metric tools is the lines of code metric. The lines of code metric states that the more lines of code that are in a particular program, then the more complex the particular program. Other prior art metrics generally perform poorly, as shown when their results are correlated with some other property of the code which is actually measurable or when compared against the lines of code metric. One reason for this, is that prior art metrics tend to lack clear definitions of terms. For example, "complexity" and "quality" are too ill-defined to be useful. Moreover, prior art metrics tend to have theoretical bases that are overly ambitious, inconsistent and/or unconvincing. Furthermore, prior art metrics lack empirical validation, have conflicting empirical results, or make predictions that are no more powerful than those produced by the lines of code metric. Research has shown that the prior art metrics do not provide any more information than the lines of code metric. The prior art metrics are largely ad hoc in the sense that they are based on conjectures about where complexity arises in software systems.

Therefore, there is a need in the art for a metric tool that provides an accurate measurement of the complexity of a software program, that also can be empirically validated. Such a software would have several applications in building and maintaining large software systems. The tool would allow for comparisons between different programs. Thus, if a user must choose between two implementations of a software system with essentially the same functionality, choosing the better structured one would provide lower costs of maintenance and extension. The tool would provide guidance in restructuring the software and thus minimize ad hoc decision making. The tool would also detect the structural degradation of programs as they evolve and grow from the addition of features and modules.

SUMMARY OF THE INVENTION

These and other objects, features and technical advantages are achieved by a system and method which uses an estimate of the entropy of the source code as a measurement of the complexity of the software.

The inventive tool considers two different kinds of relationships between symbols to the program. The first is called a structural relationship. This defines how symbols are physically grouped together. For example, if several symbols reside in the same function, then they are structurally related in that manner. Moreover, several functions may reside in the same file, files may reside in the same directory, directories may be hierarchically structured. This is physical structure that defines the structural relationships between the symbols. The second relationship is called dependency. This defines how the symbols are functionally interrelated. For example, one symbol may invoke another symbol or use a variable that is determined by another symbol. Thus, if a first function calls a second function or it accesses a variable, then the first function has a dependency on the second function, or on the variable it references.

The inventive metric tool uses information theory to estimate the amount of information needed to describe those dependencies. The information would be used to send a hypothetical message from a hypothetical sender to a hypothetical receiver to describe the program. It is assumed that the receiver of this message knows the structural relationships of the symbols, but does not know the dependencies, and thus the message would only describe the dependencies. The metric tool uses information theory to estimate the entropy, which is the number of bits or the amount of information required to describe each of the dependencies in the program. The entropy is a measure of the complexity of the program, as the greater the entropy, the more complex the dependencies and the more complex the program.

The inventive tool constructs a data graph representing the structure of the program. Each symbol is shown as a node in the graph, with the dependencies shown as edges connecting the different nodes. Information theory states that the upper bound number of bits needed to describe that target node of an edge is simply the base two log of the number of possible targets. To describe both the source and the target of an edge, twice as many bits are needed. The number of bits can be significantly lowered by utilizing the structure of a the program. Coding techniques similar to the Huffman coding methodology are used to take advantage of the structure of the data graph in forming messages to reduce the number of bits required to form a message.

It then constructs an efficient "message" that describes that structure, using the strategy of Huffman coding to reduce the number bits contained in the message. If the program is poorly structured, compression is minimal, if it is highly structured the message can be compressed a great deal. Therefore, the inventive tool uses the analogy between good structure in software and highly compressible messages in information theory. The inventive metric tool estimates the entropy or the amount of information needed to form messages that describe the software dependencies. If the program requires fewer bits to describe the dependencies, then the program is better structured. In other words, the more the messages can be compressed, the better structured and less complex the program.

It is a technical advantage of the invention to use an estimate of the entropy as a measure of the complexity of the program.

It is another technical advantage of the invention to analyze the program to form a data graph which depicts the structure and the dependencies of the program, and use the data graph in the estimation of the entropy.

It is a further technical advantage of the invention to determine an estimate of the amount of bits required to describe the dependencies of the program.

It is a still further technical advantage of the invention to reduce the amount of bits required to describe the dependencies is reduced according to Huffman coding techniques.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
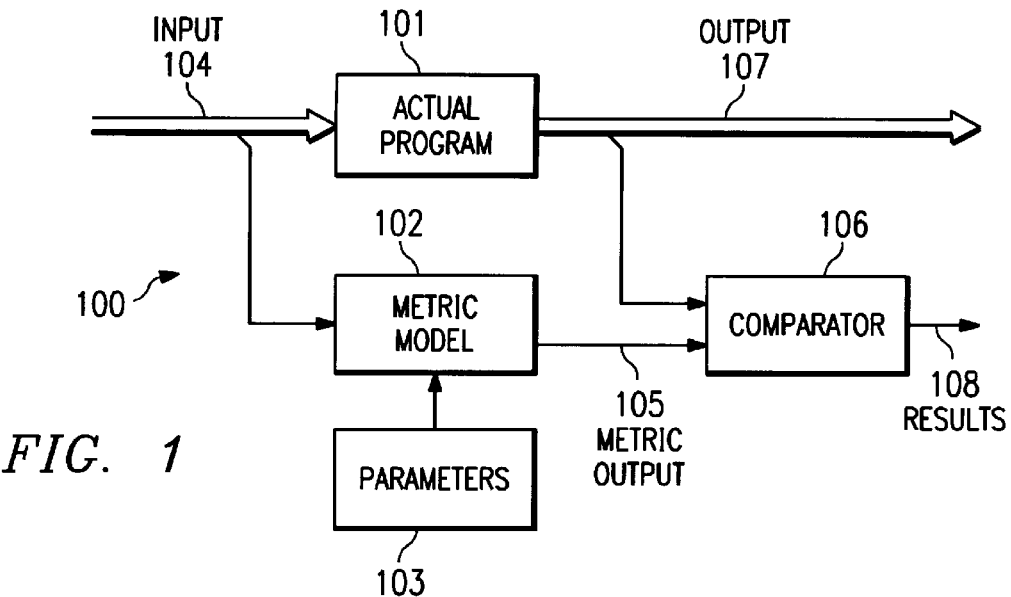
FIG. 1 depicts the arrangement of the elements of a software metric in conjunction with a software program.

The inventive metric software tool measures the degree of conformance that a software program has to the architectural principles of high intra-module cohesion and low inter-module coupling. The input to the inventive metric model is the source code of the computer program to be measured. The inventive metric output is a numeric measure of the degree of conformance.

The inventive metric uses the concept of entropy from information theory. A symbol is an identifier that represents a function or a variable within the program. Although entropy provides a theoretical lower bound limit on the amount of information needed to define "messages," it is not always computable. Therefore, the invention does not directly determine the entropy of the program structure, but rather estimates the entropy based on encoding schemes that follow the Huffman coding scheme.

The Huffman coding scheme uses statistical information about a set of symbols in order to transmit them efficiently. For example, a message comprising symbols A, B, and C is going to be sent to a distant receiver. The message comprises of 99% A's and only an occasional B or C. Thus, to send this message efficiently, the shortest code is used for the symbol A, and longer codes are used for symbols B and C. Consequently, the overall size of the message would be smaller than if the codes were equally sized. Thus, the concept of Huffman codes is to use smaller codes for the symbols that are used most often. The inventive tool uses this strategy to minimize the number of bits used for describing dependencies that statistically are more likely to occur.

T'he problem of complexity is treated by the inventive tool from the view of the programmer working the source code or at the lexical level. Since programmers work with source code when creating and/or modifying a software program, it is assumed that the complexity in software systems arise at the lexical level and not a deeper level of compilation. In particular, the tool examines global relationships between symbols in the source code, by considering, at the lexical level, the connections between functions and variables. The assumption is that global connections between modules, rather than intra-module connections, increases complexity of the program. In other words, the more dependencies a module has on other parts of the system, then the harder it is to modify the program and the more complex the program becomes. Moreover, remote dependencies are more expensive in terms of comprehensibility and complexity than local dependencies. This is a restatement of the cohesion and coupling principle.

Although the following assumes that the software to be evaluated is written in the C language, the techniques described herein may be applied to software written in any language.

The primary lexical abstraction in the C language is the symbol, which is also known as the name or the identifier.

A symbol is a character string that has the properties of scope (global, file, parameter or block) which partially defines the name space for that symbol; type, which is constructed from the built in types and the pointer, struct, union, array and enum operators; and storage class (auto, extern, register, static, typedef). Following the above assumptions about program complexity, the tool is focused on dependency relationships of symbols with global and file scope. These will be referred to herein as global symbols and include function names, global variables (a global array is treated like a global scalar in that the index is ignored), global struct and union type names, and fields of global structs and unions. Since the tool examines the large-scale structure of a software system, symbols that are strictly local in nature are excluded, for example parameter names and variables local to a function.

Figure 2:
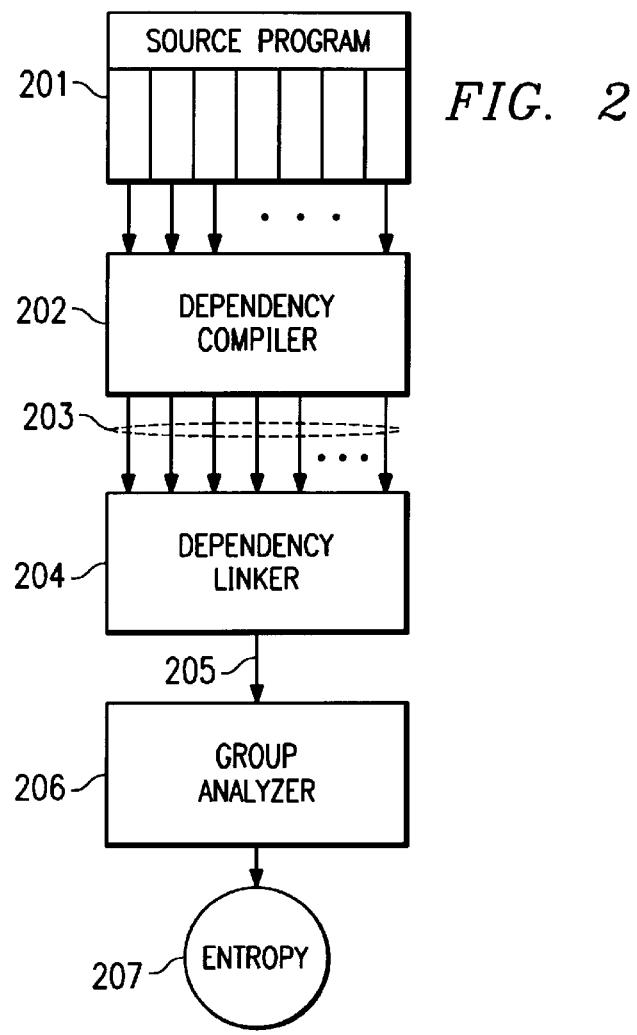
FIG. 2 depicts the inventive metric tool.
Figure 3:
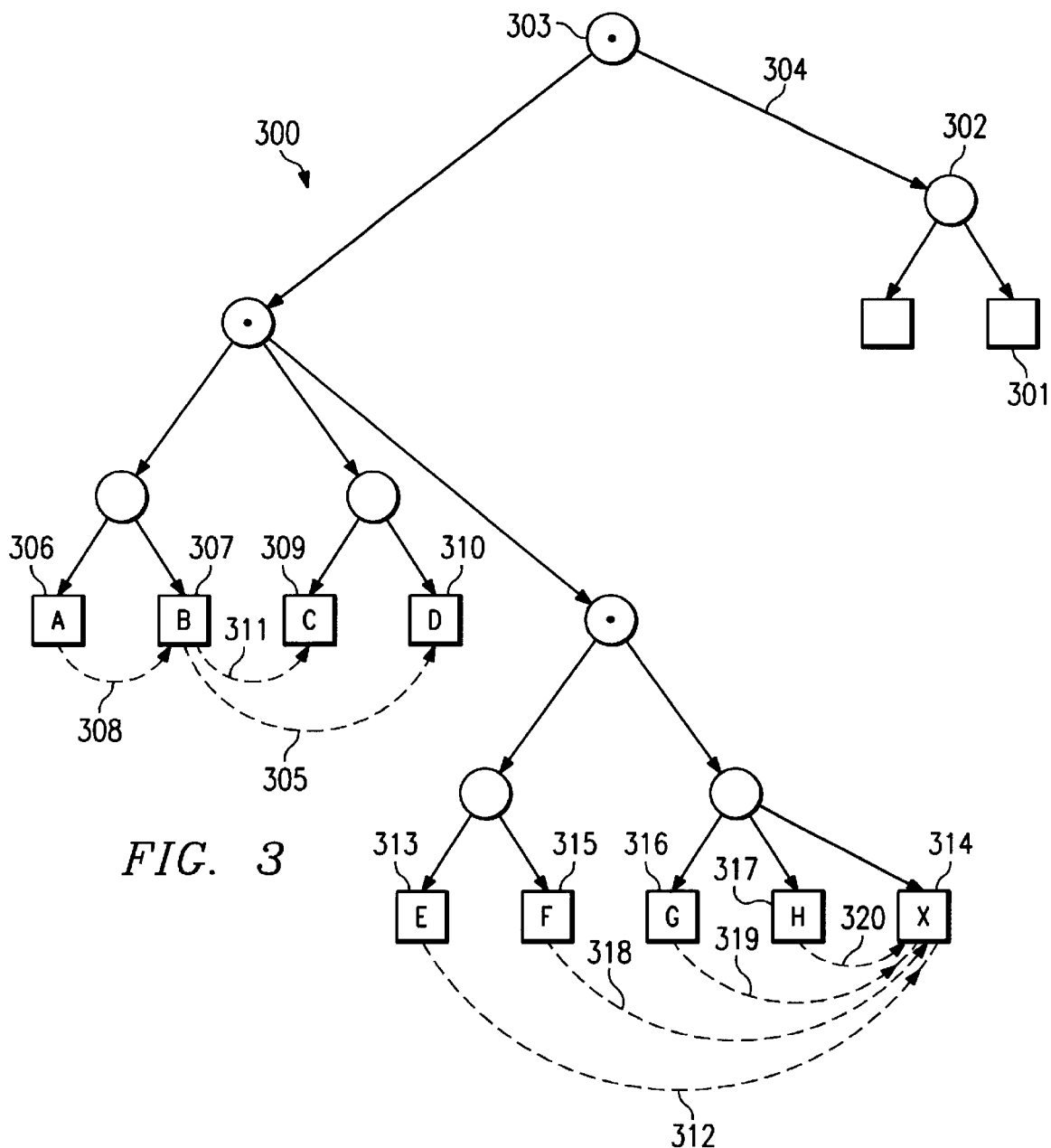
FIG. 3 depicts a directed graph of the input source code.

As shown in FIG. 2, the inventive metric tool 200 operates on a large software program, which typically comprises multiple source files 201. However, the tool will operate on a program with a single source file. These files are individually compiled and linked together to form a single data dependence graph which represents the structure of the program. The dependency compiler 202 reads each source file 201 and produces a respective dependency object file 203 which describes the non-local symbols within the source file, and the dependencies that each symbol has on other symbols. The dependency linker 204 uses the dependency object files 203 as input to create a single dependency graph 205 that represents the entire program. This dependency graph 205 can then be evaluated by the group analyzer 206 to compute the program entropy 207. The inventive tool is further explained as follows:

The software program comprising the lines of code is inputted into the metric tool and transformed into a model for analysis. The model is a directed graph 300, as shown in FIG. 3, which is composed of two different types of nodes; leaf nodes 301 and interior nodes 302, 303; and two different types of edges, structural edges 304 and dependency edges 305.

A leaf node 301 corresponds to a single global symbol in the input source code. Each function name, global variable, and global struct name is assigned to a leaf node 301. Note that each symbol is assigned to a different node. Fields are collected and represented by the leaf node of the enclosing struct name, since fields are already collected lexically. Thus, there is little to be gained by representing them as separate nodes.

An interior node 302, 303 corresponds to either an aggregate of leaf nodes 301 (i.e. c file or .h file), or an aggregate of other interior nodes 303 (such as a directory, or a subset of a directory as distinguished by a naming convention).

Structural edges 304, attached to interior and leaf nodes, create a tree that corresponds to the directory and file structure of the source code, as well as corresponding to file naming conventions. Note that a structural edge 304 may connect two interior nodes 302, 303, or an interior node 302 with a leaf node 301, but may never connect two leaf nodes 301.

A dependency edge 305 interconnects two leaf nodes and represents a dependency that one symbol has on another symbol. Two types of dependencies are considered by the tool. The first is a service dependency wherein one function invokes another. For example, if a function A 306 invokes function B 307, and A 306 depends upon the correct implementation of B 307, then A 306 has a service dependency on B 307. This is represented in the directed graph 300 by the edge 308 from A to B. FIG. 3 also shows the service dependency edges 305, 311 that result from node B 307 calling both node C 309 and node D 310 in the source code. For simplicity, all function calls will be assumed to represent service dependencies, although there are some cases where this is not true. Also indirect invocations, such as traps and interrupts, will be ignored and not viewed as service dependencies.

The second dependency is a data dependency 312. This type of dependency is where a function references a non-function global symbol. Global variables of type struct (or pointer to struct) have a data dependency on the struct symbol. Functions with a return type of struct (or pointer to struct) or with parameters of type struct (or pointer to struct) parameters have a data dependency on the struct symbol. FIG. 3 shows the data dependency edges 312, 318, 319, 320, that result from a shared global variable X 314 being referenced by functions E 313, F 315, G 316, and H 317. Other dependencies, such as environmental dependencies, are not considered because of the difficulty of extracting them from source code and their minimal effects on the entropy of the system. However, in other languages such dependencies may have greater effects on the entropy, and this should be considered, for example, JAVA.

The inventive tool measures the complexity of the software program by estimating the amount of data required to describe these dependencies. Information theory deals with the efficient transmission of messages from a sender to a receiver. The receiver must have some knowledge about the messages to be sent, e.g. whether the messages contain text, graphics, or other information, along with the encoding scheme used to send them. This common knowledge between the sender and receiver, known as the context, is open to negotiation prior to transmission. The receiver must have some knowledge about the messages to be sent and the sender must inform the receiver through messages as to what the receiver does not know. In developing the messages, the tool assumes that the receiver knows the source code tree layout comprising the nodes and structural edges as shown in FIG. 3. The tool also assumes that the receiver knows the symbols contained within each file, which corresponds to the leaf nodes 301 of FIG. 3. The tool further assumes that the receiver knows the encoding scheme for describing the dependency edges of FIG. 3. Note that the messages, the sender, and the receiver are hypothetical in nature, as the tool only determines how much information must be in a message.

What the receiver needs to learn from the sender, through efficiently encoded messages, is the service dependencies and the data dependencies of the program. A message is defined to be the precise description of both the data and service dependencies that a single leaf node or function has with the remainder of the program. The encoding scheme for the messages is derived from the statistics of the software system itself in such a way as to minimize the average length of the messages to be sent. Note that Information theory requires that the message source be approximately ergodic, meaning that its statistics be stationary and independent of initial state. It is assumed here that programs are approximately ergodic. This is at least plausible since some natural languages, such as English, have been shown to be approximately ergodic. Also note that the tool only requires that a message be sent once for each leaf node in the graph. The more bits that each message requires indicates the character of the dependencies of that node. Dependencies on "distant" symbols require bits to describe than dependencies on local symbols. Therefore, the shorter the average message length, the more the system adheres to the objectives of cohesion and coupling.

The output metric to be derived from the data graph model, $\mu$, is an estimate of the average number of bits needed to describe the dependencies that a function has with the remainder of the system. In other words, $\mu$ represents the average length of a message. The more dependencies a module has on distant parts of its environment, the more bits are needed to describe those dependencies, and hence the more difficulty there is in understanding that module, and thus the more complex the program.

Figure 4:
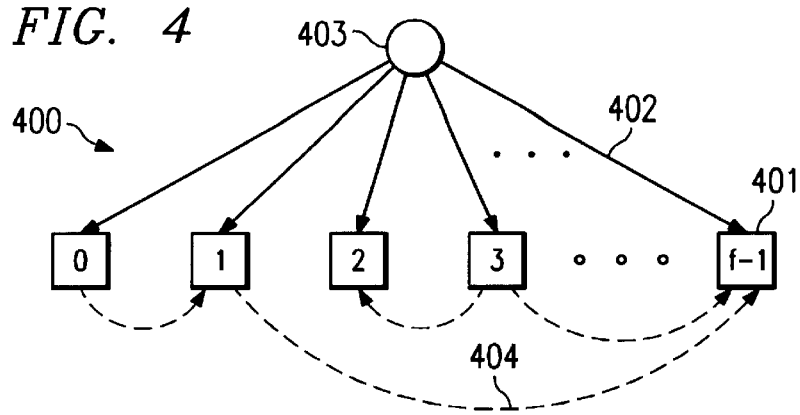
FIG. 4 depicts a simplified directed graph having only one interior node.

FIG. 4 depicts the graph of a simple program comprising of F functions, all of which reside under a single source file, and having E dependencies. This will map to a graph of FIG. 4 with F leaf nodes 401 representing the functions, structural edges 402, one interior node 403 representing the source file, and E dependency edges 404 representing the service and data dependencies.

The following definitions apply to the subsequent formulation of entropy:

F: number of leaf nodes in graph of system.

E: number of dependency edges in graph.

edges(f): number of dependency edges sourced by leaf f.

dist($f_1,f_2$): distance between leaf $f_1$ and leaf $f_2$ (which also equals the length of edge ($f_1, f_2$)). Distance is defined as being the minimum number of interior nodes that must be traversed to trace a path from $f_1$ to $f_2$. dist (A,H)=4

$P_{src}(e)$: probability that a leaf sources e edges.

$P_{dist}(d)$: probability that two random leaves will be a distance of d apart.

$P_{edge}(d)$: probability that a dependency edge will be of length d.

loc(f): number of lines of code in leaf function f.

$H_{srcs}$: entropy of count of edges sourced by leaf, which defines how many bits are needed to describe the number of edges sourced by a leaf. If a node may source 0, 1, 2, or 3 edges with equal probability, $H_{srcs}=2$.

$H_{edge}$: entropy of specifying edge destination if source is known, which defines how many bits are needed to describe the destination of an edge, if its source is known, e.g., if an edge always goes to the same target regardless of where it starts, $H_{edge}=0$. If it may go to any of 8 targets with equal probability, its entropy is 3.

$\mu$: entropy of message describing a leaf.

Assuming that the leaf nodes in FIG. 4 are numbered from 0 to f-1, then each edge could be uniquely described by a simple naive binary encoding of its source and destination nodes having a total number of bits per edge as determined by:

bits per edge $\approx 2 \log_2 F$

Since there are E/F dependency edges per node on average, the number of bits per node required to specify the dependencies is:

$\mu =$ bits per function$_{avg} \approx 2$ (E/F) $\log_2 F$

Therefore, as the number of dependencies increases, then the value of $\mu$ increases, which agrees with the assumption that global connections between modules increase complexity of the program.

The above describes a simple approach, wherein if there are N total symbols in the program, with M edges, then each edge will require $2 \log_2 N$ bits to describe it, for a total of $2M \log_2 N$ bits. However, this ignores the lexical structure of a system. The value of $\mu$ can be significantly lowered by exploiting that structure. This allows for measuring complexity from circumstances other than just the number of nodes and edges. For example, if two pieces of software have equal number of nodes and edges, with the first piece having all of the edges target a single node, and the second piece having each edge target a different node, then the first piece will be less complex than the second, and as a result the first should have a lower entropy than the second. In the invention, a Huffman-like coding is used to specify the target of each dependency edge relative to the tree formed by the structural edges. This will reduce the number of bits used to specify the total dependency graph, depending on the cohesion and coupling of the system. Systems with high cohesion and loose coupling will compress more than unstructured systems.

The Huffman-like encoding scheme for describing the dependencies that leads to a shorter message. The resulting average message length will then reflect the entropy of the system as a whole (smaller entropy implies better structure). Transmitting the dependency edges requires F messages, one message for each leaf node. Since the receiver already knows the source structure, the messages can be sent in a predetermined manner, for example sequentially in lexicographic order, i.e.:

{leaf(0), leaf(1), leaf(2), ... }

Each message is a list of the dependency edges sourced by the leaf associated with that message. For example, a message for leaf node f could be of the form:

message(f)={edge$_{f,1}$, edge$_{f,2}$, edge$_{f,3}$, ... edge$_{f,n}$}

An edge can be specified by a (source node, destination node) tuple, but since the messages are sent in the order of the leaves, the source node may be factored out and inferred from the message's position in the sequence, and therefore does not need to be explicitly stated. It is sufficient to encode the number of edges included in the message so that message boundaries may be identified. For example, the message for leaf node f could be encoded as:

message(f)={edges(f), dest$_1$, dest$_2$, dest$_3$, ... , dest$_n$}

The entropy of such a message (the average number of bits needed per message) is thus $\mu \approx H_{srcs} + $(E/F)$ H_{edge}$ where $H_{srcs} \approx -\Sigma p_{src}(e) \log_2 p_{src}(e)$ with the summation over e from 0 to the maximum number of edges sourced by any leaf in the graph; and $H_{edge} \approx \Sigma p_{edge}(d) \log_2(F\ p_{dist}(d))$ with the summation over d from 1 to the maximum path length in the graph. The expression $\log_2$ (F $p_{dist}(d)$) is the entropy of specifying a destination at distance d, where all such destinations at that distance are equally likely. The equation for $H_{edge}$ follows from the independence of the multiple edge description message sources, (one source for each distance). Note that by the assumption that the more dependencies a module has on distant parts of the system, the harder it is to modify, thus, $p_{edge}$ is not uniform.

A further reduction in the message size can originate from the structural relationships in the program, specifically the file structure and the directory structure. The principals of tight cohesion and loose coupling are reflected in the source code through the file and directory structure. For example, a module that is tightly coupled in a well structured system will reside in just one file. Most of the dependency edges within that module will stay within that single file, and very few will go to other files. This allows further compression of the messages in describing the edges, since most of the edges would only go to a small number of other symbols within a file, rather than anywhere in the system, and thus fewer bits are required on average to describe those edges Note that as the number of things close is generally smaller than the number of things farther away. Distance plays a role here. Information theory states that if the probability distributions of how nodes are connected is known, then this information can be used to reduce message length. This is an analogous to software engineering principles of coupling and cohesion, in the sense that if the program is well structured and references to variables and functions are mostly localized, then the messages describing these nodes can also be shortened.

Note that the metric described above does not take into account the size of functions when computing the system entropy. There is an implicit assumption that functions are small relative to the system as a whole, and that the internal complexity of a function is of little consequence. However, this makes it possible to subvert the metric by expanding functions inline in the functions from which they are called. This can be minimized by refining the specification of the endpoints of a dependency edge to include note only the function, but the line number within the function as well. This does not change the number of bits needed to specify the destination of an edge, since in C language, a function may only be entered through its first line. However, the source of an edge would require the additional specification of the line number within the source function where the dependence occurs. If it is assumed that the receiver is informed of the number of lines of code in each function before transmission of the dependency messages, and that all source lines within a function are equally likely to be the source of a dependency, the entropy of an edge would become:

$$H_{edge} \approx (\Sigma p_{edge}(d) \log_2(F p_{dist}(d)) + (1/F)\Sigma \log_2(loc(f))$$

where the second term is the average number of bits needed to specify the line within the source function that sources the edge, where f is summed over from 1 to F.

Thus, there is an analogy between good structure in software and highly compressible messages in information theory. The correlation allows the inventive metric tool to estimate the entropy or the amount of information needed to form messages that describe the software dependencies. If the system requires fewer bits to describe the dependencies, then the program is better structured. In other words, the more the messages can be compressed, the better structured and less complex the program. The results of the inventive metric tool can be empirical compared with other actual characteristics. For example, defect rate, average bug fix time, failure rate, etc.

Although the present invention and its advantages have been described in detail, it should be understood that various changes, substitutions and alterations can be made herein without departing from the spirit and scope of the invention as defined by the appended claims.

What is claimed is:

1. A computer program product having a computer readable medium having computer program logic recorded thereon for measuring complexity of a software program, comprising:

means for graphing a structure of a source code of the software program, wherein the source code of the software program is segregated into a plurality of modules; and means for estimating an entropy of the structure;

wherein the entropy relates to the complexity of the software program and indicates a measure of intra-module cohesion and inter-module coupling.

2. The product of claim 1, wherein between a first entropy value and a second entropy value the higher entropy value indicates a more complex program, and the lower entropy value indicates a less complex program.

3. The product of claim 1, wherein the upper bound of entropy $\mu$ is calculated by:

$$\mu_u \approx 2(E/F) \log_2 F$$

wherein $\mu_u$ is the upper bound of the entropy $\mu$, E is a number of dependency edges in the structure, and F is a number of leaf nodes in the structure.

4. The product of claim 1, wherein the entropy $\mu$ is calculated by:

$$\mu \approx H_{srcs} + (E/F) H_{edge}$$

wherein $\mu$ is the entropy, E is a number of dependency edges in the structure, F is a number of leaf nodes in the structure, $H_{srcs}$ is an entropy of a number of edges sourced by a leaf node, and $H_{edge}$ is an entropy of an edge destination node.

5. The product of claim 4, wherein $H_{srcs}$ is calculated by:

$$H_{srcs} \approx -\Sigma p_{src}(e) \log_2 p_{src}(e)$$

wherein the summation over e is from 0 to a maximum number of edges sourced by any leaf node in the structure, and $p_{src}(e)$ is a probability that a leaf node sources e edges in the structure.

6. The product of claim 4, wherein $H_{edge}$ is calculated by:

$$H_{edge} \approx \Sigma p_{edge}(d) \log_2(F p_{dist}(d))$$

wherein the summation over d is from 1 to a maximum path length in the structure, $p_{dist}(d)$ is a probability that two random leaf nodes in the structure will be a distance of d apart, and $p_{edge}(d)$ is a probability that a dependency edge will be of length d.

7. The product of claim 4, wherein $H_{edge}$ is calculated by:

$$H_{edge} \approx (\Sigma p_{edge}(d) \log_2(F p_{dist}(d))) + (1/F)\Sigma \log_2(loc(f))$$

wherein the summation over d is from 1 to a maximum path length in the structure, the summation over f is from 1 to F, $p_{dist}(d)$ is a probability that two random leaf nodes in the structure will be a distance of d apart, and $p_{edge}(d)$ is a probability that a dependency edge will be of length d, and loc(f) is a number of code lines in leaf node f.

8. The product of claim 1, wherein the means for graphing produces a data graph of the program, the data graph comprises:

a plurality of nodes; and a plurality of edges, each of which interconnects the plurality of nodes to form a tree.

9. The product of claim 8, wherein:

the plurality of nodes comprises at least one interior node, and at least two leaf nodes.

10. The product of claim 9, wherein:

each leaf node corresponds to a different global symbol of the program.

11. The product of claim 9, wherein:

the one interior node corresponds to an aggregate of the leaf nodes.

12. The product of claim 9, wherein:

the plurality of nodes comprises at least three interior nodes; and one of the three interior nodes corresponds to an aggregate of the remaining interior nodes.

13. The product of claim 9, wherein:

the plurality of edges comprises at least two structural edges, and at least one dependency edge;

each structural edge interconnects one of the leaf nodes to the interior node; and the one dependency edge interconnects the leaf nodes.

14. The product of claim 13, wherein:

the one dependency edge indicates a service dependency between the leaf nodes, such that a function of one leaf node invokes a function of the other leaf node.

15. The product of claim 13, wherein:

the one dependency edge indicates a data dependency between the leaf nodes, such that a function of one leaf node accesses a non-function symbol of the other leaf node.

16. The product of claim 15, wherein the means for estimating the entropy comprises:

means for determining an amount of information required to describe the one dependency edge.

17. The product of claim 16, wherein the means for estimating the entropy further comprises:

means for reducing the amount of information required to describe the one edge, by examining the structure of the graph and arranging the nodes in a predetermined order.

18. The product of claim 17, wherein:

the predetermined order is lexicographic.

19. The product of claim 16, wherein:

the means for determining an amount of information required to describe the one dependency edge includes information about a code line number in the program that sources the one dependency edge.

20. A method for measuring complexity of a software program, comprising the steps of:

graphing a structure of a source code software of the program; and estimating an entropy of the structure;

wherein the entropy relates to the complexity of the program, indicates at least a measure of intra-module cohesion of a module of the program, and is used in managing the program.

21. The method of claim 20, further comprising the step of:

segregating the program into a plurality of modules;

wherein the entropy further indicates a measure of inter-module coupling.

22. The method of claim 20, wherein between a first entropy value and a second entropy value the higher entropy value indicates a more complex program, and the lower entropy value indicates a less complex program.

23. The method of claim 20, wherein the step of estimating the upper bound of the entropy is performed by calculating:

$$\mu_u \approx 2(E/F) \log_2 F$$

wherein $\mu_u$ is the upper bound of the entropy $\mu$, E is a number of dependency edges in the structure, and F is a number of leaf nodes in the structure.

24. The method of claim 20, wherein the step of estimating the entropy is performed by calculating:

$$\mu \approx H_{srcs} + (E/F) H_{edge}$$

wherein $\mu$ is the entropy, E is a number of dependency edges in the structure, F is a number of leaf nodes in the structure, $H_{srcs}$ is an entropy of a number of edges sourced by a leaf node, and $H_{edge}$ is an entropy of an edge destination.

25. The method of claim 24, wherein $H_{srcs}$ is calculated by:

$$H_{srcs} \approx \Sigma p_{src}(e) \log_2 p_{src}(e)$$

wherein the summation over e is from 0 to a maximum number of edges sourced by any leaf node in the structure, and $p_{src}(e)$ is a probability that a leaf node sources e edges in the structure.

26. The method of claim 24, wherein $H_{edge}$ is calculated by:

$$H_{edge} \approx \Sigma p_{edge}(d) \log_2(F p_{dist}(d))$$

wherein the summation over d is from 1 to a maximum path length in the structure, $p_{dist}(d)$ is a probability that two random leaf nodes in the structure will be a distance of d apart, and $p_{edge}(d)$ is a probability that a dependency edge will be of length d.

27. The method of claim 24, wherein $H_{edge}$ is calculated by:

$$H_{edge} \approx (\Sigma p_{edge}(d) \log_2(F p_{dist}(d))) + (1/F) \Sigma \log_2(\mathrm{loc}(f))$$

wherein the summation over d is from 1 to a maximum path length in the structure, the summation over f is from 1 to F, $p_{dist}(d)$ is a probability that two random leaf nodes in the structure will be a distance of d apart, and $p_{edge}(d)$ is a probability that a dependency edge will be of length d, and loc(f) is a number of code lines in leaf node f.

28. The method of claim 20, wherein the step of graphing produces a data graph of the program, the data graph comprises:

a plurality of nodes; and a plurality of edges, each of which interconnects the plurality of nodes to form a tree.

29. The method of claim 28, wherein:

the plurality of nodes comprises at least one interior node, and at least two leaf nodes.

30. The method of claim 29, wherein:

each leaf node corresponds to a different global symbol of the program.

31. The method of claim 29, wherein:

the one interior node corresponds to an aggregate of the leaf nodes.

32. The method of claim 29, wherein the plurality of edges comprises at least two structural edges, and at least one dependency edge, the method further comprises the steps of:

interconnecting, via one of the structural edges, one of the leaf nodes to the interior node; and interconnecting, via the one dependency edge, the leaf nodes.

33. The method of claim 32, wherein the step of estimating the entropy comprises the step of:

determining an amount of information required describe the one dependency edge.

34. The method of claim 33, wherein the step of estimating the entropy further comprises the step of:

reducing the amount of information required to describe the one edge, by examining the structure of the graph and arranging the nodes in a predetermined order.

35. The method of claim 34, wherein:

the predetermined order is lexicographic.

36. The method of claim 33, wherein the step of determining an amount of information required comprises the step of:

incorporating information about a code line number in the program that sources the one dependency edge.

37. The method of claim 20, wherein managing the program includes building the program.

38. The method of claim 20, wherein managing the program includes maintaining the program.

39. The method of claim 20, wherein managing the program includes comparing the entropy of the program to the entropy of another program having a similar operation to the program, and selecting the program with the lower entropy.

* * * * *

UNITED STATES PATENT AND TRADEMARK OFFICE
CERTIFICATE OF CORRECTION

PATENT NO. : 6,128,773
DATED : October 3, 2000
INVENTOR(S) : Gregory S. Snider

It is certified that error appears in the above-identified patent and that said Letters Patent is hereby corrected as shown below:

Column 11,
Line 51, after "code" delete "software"
Line 52, before "program" insert -- software --

Signed and Sealed this

Eighteenth Day of June, 2002

Attest:

Attesting Officer

JAMES E. ROGAN
*Director of the United States Patent and Trademark Office*